(12) United States Patent
Lepak

(10) Patent No.: US 7,797,495 B1
(45) Date of Patent: Sep. 14, 2010

(54) DISTRIBUTED DIRECTORY CACHE

(75) Inventor: Kevin Michael Lepak, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 823 days.

(21) Appl. No.: 11/197,215

(22) Filed: Aug. 4, 2005

(51) Int. Cl.
*G06F 12/00* (2006.01)
*G06F 13/00* (2006.01)
*G06F 13/28* (2006.01)

(52) U.S. Cl. .................. 711/141; 711/142; 711/143; 711/144; 711/145; 711/146

(58) Field of Classification Search ............... 711/118, 711/141–146
See application file for complete search history.

(56) References Cited

U.S. PATENT DOCUMENTS

| | | | | |
|---|---|---|---|---|
| 5,463,753 | A * | 10/1995 | Fry et al. | 711/146 |
| 6,101,581 | A * | 8/2000 | Doren et al. | 711/141 |
| 6,810,467 | B1 * | 10/2004 | Khare et al. | 711/146 |
| 6,826,651 | B2 | 11/2004 | Michael et al. | 711/119 |
| 6,868,481 | B1 | 3/2005 | Gaither et al. | 711/119 |
| 6,868,485 | B1 | 3/2005 | Conway | 711/154 |
| 6,922,755 | B1 | 7/2005 | Safranek et al. | 711/144 |
| 6,973,543 | B1 | 12/2005 | Hughes | 711/141 |
| 7,206,934 | B2 | 4/2007 | Pabla et al. | 713/168 |
| 7,523,327 | B2 * | 4/2009 | Cline et al. | 713/320 |
| 2002/0083274 | A1 * | 6/2002 | Gharachorloo et al. | 711/144 |
| 2003/0154345 | A1 * | 8/2003 | Lyon | 711/122 |
| 2003/0217234 | A1 * | 11/2003 | Rowlands | 711/141 |
| 2004/0088496 | A1 * | 5/2004 | Glasco et al. | 711/141 |
| 2004/0268061 | A1 * | 12/2004 | Khare et al. | 711/151 |
| 2005/0154831 | A1 * | 7/2005 | Steely et al. | 711/130 |
| 2005/0160240 | A1 * | 7/2005 | Van Doren et al. | 711/146 |
| 2005/0251626 | A1 * | 11/2005 | Glasco | 711/133 |

(Continued)

OTHER PUBLICATIONS

Martin, et al., "Using Destination-Set Prediction to Improve the Latency/Bandwidth Tradeoff in Shared-Memory Multiprocessors", Appears in the proceedings of the 30th Annual Symposium on Computer Architecture (ISCA-30), Jun. 9-11, 2003, pp. 1-12.

*Primary Examiner*—Sanjiv Shah
*Assistant Examiner*—Yaima Campos
(74) *Attorney, Agent, or Firm*—Rory D. Rankin; Meyertons, Hood, Kivlin, Kowert & Goetzel, P.C.

(57) ABSTRACT

A system and method for a distributed directory cache in a computing system. A system comprises a plurality of nodes including at least a source node, home node, and one or more target nodes. The source node is configured to convey a request to a home node for a coherency unit, wherein the coherency unit corresponds to a super line which comprises a plurality of coherency units including the requested coherency unit. Prior to conveying the request, the source node is configured to indicate that the request is a non-probing request responsive to determining that none of the plurality of coherency units of the super line are cached in any of the other nodes. In response to receiving the request, the home node is configured to initiate the conveyance of one or more probes to one or more target nodes, if the response does not indicate it is a non-probing request, and inhibit the conveyance of the probes if the request indicates it is a non-probing request.

23 Claims, 9 Drawing Sheets

U.S. PATENT DOCUMENTS

2007/0055826 A1* 3/2007 Morton et al. .............. 711/141
2007/0156972 A1* 7/2007 Uehara et al. ............... 711/146
2010/0005245 A1* 1/2010 Beers et al. ................. 711/143

* cited by examiner

| Command | Packet Type |
|---|---|
| ReadSized | Command |
| RdBlk | Command |
| RdBlkS | Command |
| RdBlkMod | Command |
| ChangetoDirty | Command |
| WrSized | Command/Data |
| VicBlk | Command/Data |
| Probe | Command |
| Broadcast | Command |
| ValidateBlk | Command |
| RdResponse | Response/Data |
| ProbeResp | Response |
| TgtStart | Response |
| TgtDone | Response |
| SrcDone | Response |
| MemCancel | Response |
| Nop | Info |
| Sync | Info |

| | | |
|---|---|---|
| 0 | 0000 0000 0000 0000 | |
| 64 | 0000 0000 0100 0000 | } 510  560A ↙ 0000XXXXXXXX |
| 128 | 0000 0000 1000 0000 | |
| 192 | 0000 0000 1100 0000 | |
| 256 | 0000 0001 0000 0000 | } 520  560B ↙ 0001XXXXXXXX |
| 320 | 0000 0001 0100 0000 | |
| 384 | 0000 0001 1000 0000 | |
| 448 | 0000 0001 1100 0000 | |
| 512 | 0000 0010 0000 0000 | } 530  560C ↙ 0010XXXXXXXX |
| 576 | 0000 0010 0100 0000 | |
| 640 | 0000 0010 1000 0000 | |
| 704 | 0000 0010 1100 0000 | |
| 768 | 0000 0011 0000 0000 | } 540  560D ↙ 0011XXXXXXXX |
| 832 | 0000 0011 0011 1111 | |
| 896 | 0000 0011 0111 1111 | |
| 960 | 0000 0011 1011 1111 | |

DISTRIBUTED DIRECTORY CACHE

BACKGROUND OF THE INVENTION

1. Field of the Invention

This invention is related to computer systems and, more particularly, to coherency mechanisms within computer systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system.

Since a given block may be stored in one or more caches, and further since one of the cached copies may be modified with respect to the copy in the memory system, computer systems often maintain coherency between the caches and the memory system. Coherency is maintained if an update to a block is reflected by other cache copies of the block according to a predefined coherency protocol. Various specific coherency protocols are well known. As used herein, a "block" is a set of bytes stored in contiguous memory locations which are treated as a unit for coherency purposes. In some embodiments, a block may also be the unit of allocation and deallocation in a cache. The number of bytes in a block may be varied according to design choice, and may be of any size. As an example, 32 byte and 64 byte blocks are often used.

Many coherency protocols include the use of snoops, also referred to as probes, to communicate between various caches within the computer system. Generally speaking, a "probe" is a message passed from the coherency point in the computer system to one or more caches in the computer system to determine if the caches have a copy of a block and optionally to indicate the state into which the cache should place the block. The coherency point may transmit the probes in response to a command from a component (e.g. a processor or IO device) to read or write the block. Each probe receiver responds to the probe, and once the probe responses are received the command may proceed to completion. The coherency point is the component responsible for maintaining coherency, e.g. a memory controller for the memory system.

Computer systems generally employ either a broadcast cache coherency protocol or a directory based cache coherency protocol. In a system employing a broadcast protocol, probes are broadcast to all processors (or cache subsystems). When a subsystem having a shared copy of data observes a probe resulting from a command for exclusive access to the block, its copy is typically invalidated. Likewise, when a subsystem that currently owns a block of data observes a probe corresponding to that block, the owning subsystem typically responds by providing the data to the requestor and invalidating its copy, if necessary.

In contrast, systems employing directory based protocols maintain a directory containing information indicating the existence of cached copies of data. Rather than unconditionally broadcasting probes, the directory information is used to determine particular subsystems (that may contain cached copies of the data) to which probes need to be conveyed in order to cause specific coherency actions. For example, the directory may contain information indicating that various subsystems contain shared copies of a block of data. In response to a command for exclusive access to that block, invalidation probes may be conveyed to the sharing subsystems. The directory may also contain information indicating subsystems that currently own particular blocks of data. Accordingly, responses to commands may additionally include probes that cause an owning subsystem to convey data to a requesting subsystem. Numerous variations of directory based cache coherency protocols are well known.

Since probes must be broadcast to all other processors in systems that employ broadcast cache coherency protocols, the bandwidth associated with the network that interconnects the processors can quickly become a limiting factor in performance, particularly for systems that employ large numbers of processors or when a large number of probes are transmitted during a short period. In such environments, systems employing directory protocols may attain overall higher performance due to reduced latency when accessing local memory, lessened network traffic and the avoidance of network bandwidth bottlenecks. While directory based systems may allow for more efficient cache coherency protocols, such systems may still require probes for certain transactions, which may increase the overall latency of such transactions. Such directory protocols may be slower than broadcast protocols when probes must be sent because of serialization of the directory lookup for components to probe and the probes. Broadcast protocols need not perform a directory lookup before sending probes.

Accordingly, effective methods and mechanisms for maintaining coherency in such computing systems is desired.

SUMMARY OF THE INVENTION

A system and method for a distributed directory cache in a computing system are contemplated. A system comprises a plurality of nodes including at least a source node, home node, and one or more target nodes. The source node is configured to convey a request to a home node for a coherency unit, wherein the coherency unit corresponds to a super line which comprises a plurality of coherency units including the requested coherency unit. Prior to conveying the request, the source node is configured to indicate that the request is a non-probing request responsive to determining that none of the plurality of coherency units of the super line are cached in any of the other nodes. In response to receiving the request, the home node is configured to initiate the conveyance of one or more probes to one or more target nodes, if the response does not indicate it is a non-probing request, and inhibit the conveyance of the probes if the request indicates it is a non-probing request.

In response to receiving a request from a source node, the home node is generally configured to initiate the conveyance of one or more probes corresponding to a requested coherency unit to one or more target nodes. However, if a request received by the home node indicates it is a non-probing request, the home node inhibits conveyance of the one or more probes, and returns a copy of the requested coherency unit to the requesting source node.

Target nodes which receive a probe from the home node may determine whether the coherency unit identified by the probe is cached in the target node. In addition, each target node may also determine whether any of the plurality of coherency units of the corresponding super line are cached within the target node. Each target node may then convey a response which indicates whether any of the memory blocks of the super line are cached within the target node.

In one embodiment, the source node is configured to maintain and access a super line directory in order to determine whether any of the coherency units of the super line are cached in any of the plurality of nodes other than the source node. In one embodiment, the source node is configured to receive probe responses corresponding to a requested coherency unit from target nodes. If none of the target nodes are currently caching any of the coherency unit of the super line, the source node may store an indication in the super line directory that no other nodes are caching a copy of the requested coherency or any other coherency units of the corresponding super line.

In addition to the above, it is also contemplated that the source node may indicate that the request is a non-probing request in response to determining that none of the plurality of coherency units of the super line are cached in any of the plurality of nodes other than the source node in other than a shared state. In such an embodiment, each of the target nodes may be configured to determine whether any of the super line coherency units are cached in other than the shared state. In response to making such a determination, each target node may provide a probe response to the source node which indicates whether any of the coherency units of the super line are cached in a non-shared state.

These and other embodiments are contemplated and will be appreciated upon reference to the following description and figures.

BRIEF DESCRIPTION OF THE DRAWINGS

Other objects and advantages of the invention will become apparent upon reading the following detailed description and upon reference to the accompanying drawings in which:

FIG. 2 is a table illustrating one embodiment of packet definitions.

FIG. 5 is a block diagram of one embodiment of a memory space.

Figure 1:
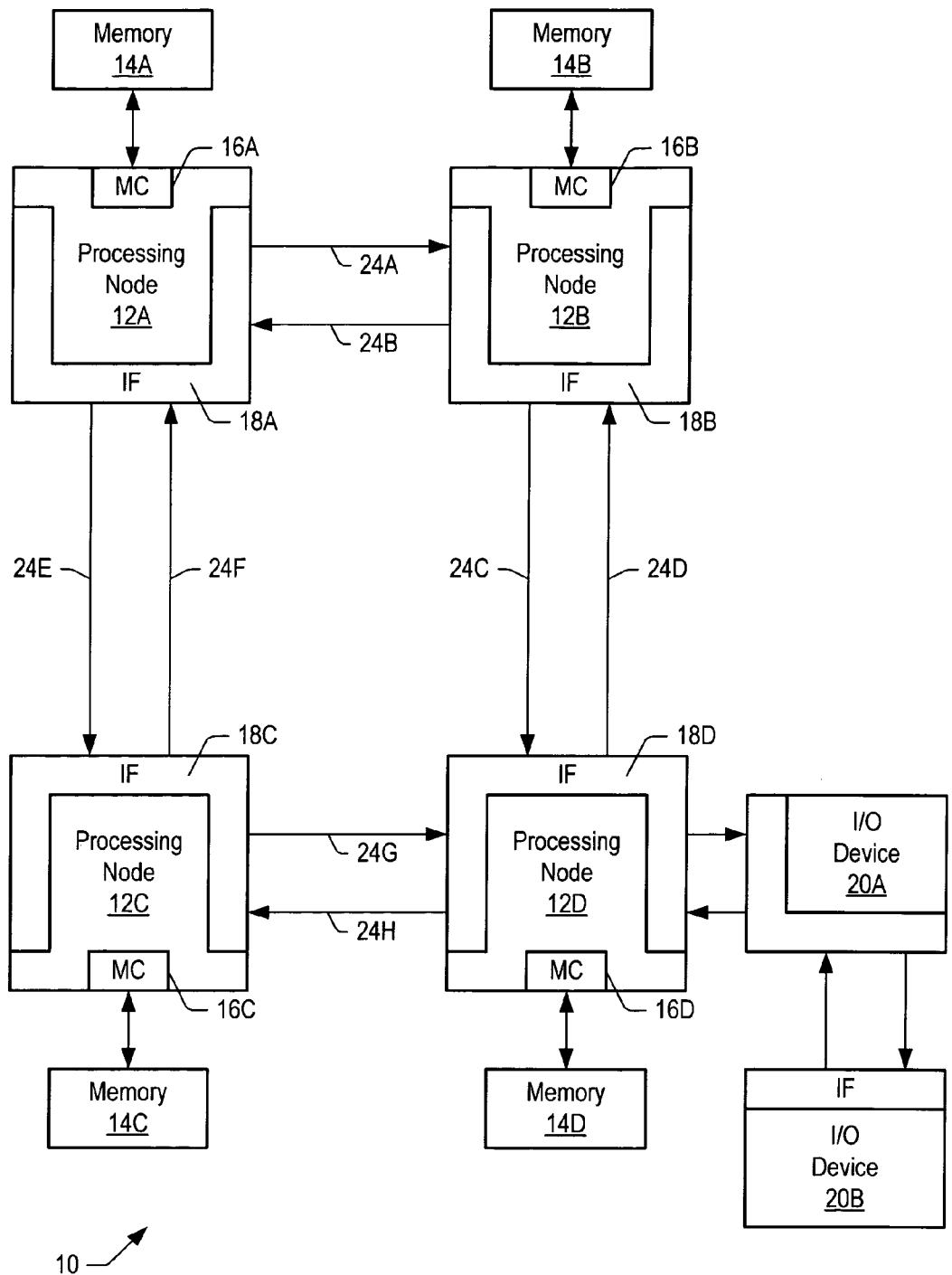
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

System Overview

FIG. 1 depicts one embodiment of a computer system 10. Computer system 10 includes a plurality of processing nodes 12A, 12B, 12C, and 12D. Each processing node is coupled to a respective memory 14A-14D via a respective memory controller 16A-16D. Additionally, each processing node 12A-12D includes interface logic 18A-18D used to communicate with others of the processing nodes 12A-12D. For example, processing node 12A includes interface logic 18A for communicating with processing nodes 12B and 12C. Similarly, processing node 12B includes interface logic 18B for communicating with processing nodes 12A and 12D, and so on. In the embodiment of FIG. 1, processing node 12D is shown coupled to communicate with an input/output (I/O) device 20A via interface logic 18D, and I/O device 20A is further coupled to a second I/O device 20B. Other processing nodes may communicate with other I/O devices in a similar fashion. Alternatively, a processing node may communicate with an I/O bridge which is coupled to an I/O bus.

Computer system 10 may implement a packet-based link for inter-node communication. In the depicted embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C-24H are used to transmit packets between other processing nodes as illustrated in FIG. 1. The link may be operated in a cache coherent fashion for communication between processing nodes or in a non-coherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes than the embodiment shown in FIG. 1. In addition, other embodiments are possible in which each processing node is coupled to every other processing node through a point-to-point network.

In addition to the depicted memory controller and interface logic, each processing node 12A-12D may include one or more processors and associated caches, as described further below. Broadly speaking, a processing node comprises at least one processor and may optionally include a memory controller for communicating with a memory and other logic, as desired. It is noted that the terms "processing node" and "processor node" may be used interchangeably herein.

Memories 14A-14D may comprise any suitable memory devices. For example, a memory 14A-14D may comprise one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address should be routed. The particular processing node associated with a given memory address may be referred to herein as the home node of that address. In one embodiment, the coherency point for an address within computer system 10 is the memory controller 16A-16D coupled to the memory storing bytes corresponding to the address. Memory controllers 16A-16D may comprise control circuitry for interfacing to memories 14A-14D. Additionally, memory controllers 16A-16D may include request queues for queuing memory requests.

Generally, interface logic 18A-18D may comprise buffers for receiving packets from the link and for buffering packets to be transmitted upon the link. Computer system 10 may employ any suitable link level flow control mechanism for transmitting packets reliably. Communications between processing nodes 12A-12D of computer system 10 may be accommodated using various specific packet-based messaging, as desired.

I/O devices 20A-20B are illustrative of any desired peripheral devices. For example, I/O devices 20A-20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

FIG. 2 is a table 38 illustrating an exemplary set of packet-based messages employed according to one embodiment of the coherent link within computer system 10. Other embodiments are possible and contemplated, including embodiments employing other suitable packet definitions, or embodiments that employ bus based communication mechanisms.

As illustrated in FIG. 2, a read transaction may be initiated using one of the ReadSized, RdBlk, RdBlkS or RdBlkMod commands. The ReadSized command may be used for non-cacheable reads or reads of data other than a block in size. The amount of data to be read is encoded into the ReadSized command packet. For reads of a block, the RdBlk command may be used unless: (i) a writeable copy of the block is desired, in which case the RdBlkMod command may be used; or (ii) a copy of the block is desired but no intention to modify the block is known, in which case the RdBlkS command may be used. In general, the appropriate read command is transmitted from the source initiating the transaction to a target node which owns the memory corresponding to the block. In addition, in one embodiment, each of the above described read commands may be encoded as either "probing" or "non-probing" reads, as will be discussed in greater detail below. In response to a probing read, the target node may transmit Probe commands to the other nodes in the system to maintain coherency.

In some instances, probe commands result in changes to the state of the block in certain nodes and may also result in an updated copy of the block, if present, to be sent to the source node. Each node receiving a Probe command transmits a ProbeResp response packet to the source node. If a probed node has an updated copy of the read data (i.e. dirty data), that node transmits a RdResponse response packet and the (dirty) data. Additionally, the memory controller in the target node transmits the requested read data using a RdResponse response packet followed by the data in a data packet. If the source node receives a RdResponse response packet from a probed node, that read data is used. Otherwise, the data from the target node is used. Once each of the probe responses and the read data is received in the source node, the source node transmits a SrcDone response packet to the target node as a positive acknowledgement of the termination of the transaction. A node transmitting dirty data may also transmit a MemCancel response packet to the target node in an attempt to cancel transmission by the target node of the requested read data.

A write transaction may be initiated using a WrSized or VicBlk command followed by a corresponding data packet. The WrSized command may be used for non-cacheable writes or writes of data other than a block in size. To maintain coherency for WrSized commands, the target node may transmit Probe commands to each of the other nodes in the system. In response to Probe commands, each probed node transmits a ProbeResp response packet to the target node. If a probed node is storing dirty data, the probed node responds with a RdResponse response packet and the dirty data. In this manner, a block updated by the WrSized command is returned to the memory controller for merging with the data provided by the WrSized command. The memory controller, upon receiving probe responses from each of the probed nodes, transmits a TgtDone response packet to the source node to provide a positive acknowledgement of the termination of the transaction. The source node replies with a SrcDone response packet.

A victim block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

The ChangetoDirty command packet may be transmitted by a source node in order to obtain write permission for a block stored by the source node in a non-writeable state. A transaction initiated with a ChangetoDirty command may operate similar to a read except that the target node does not return data. The ValidateBlk command may be used to obtain write permission to a block not stored by a source node if the source node intends to update the entire block. No data is transferred to the source node for such a transaction, but otherwise operates similar to a read transaction.

The TgtStart response may be used by a target to indicate that a transaction has been started (e.g. for ordering of subsequent transactions). The Nop info packet is a no-operation packet which may be used, e.g. to transfer buffer free indications between nodes. The Broadcast command may be used to broadcast messages between nodes (e.g., the broadcast command may be used to distribute interrupts). Finally, the sync info packet may be used for cases in which synchronization of the fabric is desired (e.g. error detection, reset, initialization, etc.). It is noted that in other embodiments, other types of commands and associated coherency protocols may be employed, as desired.

Figure 3:
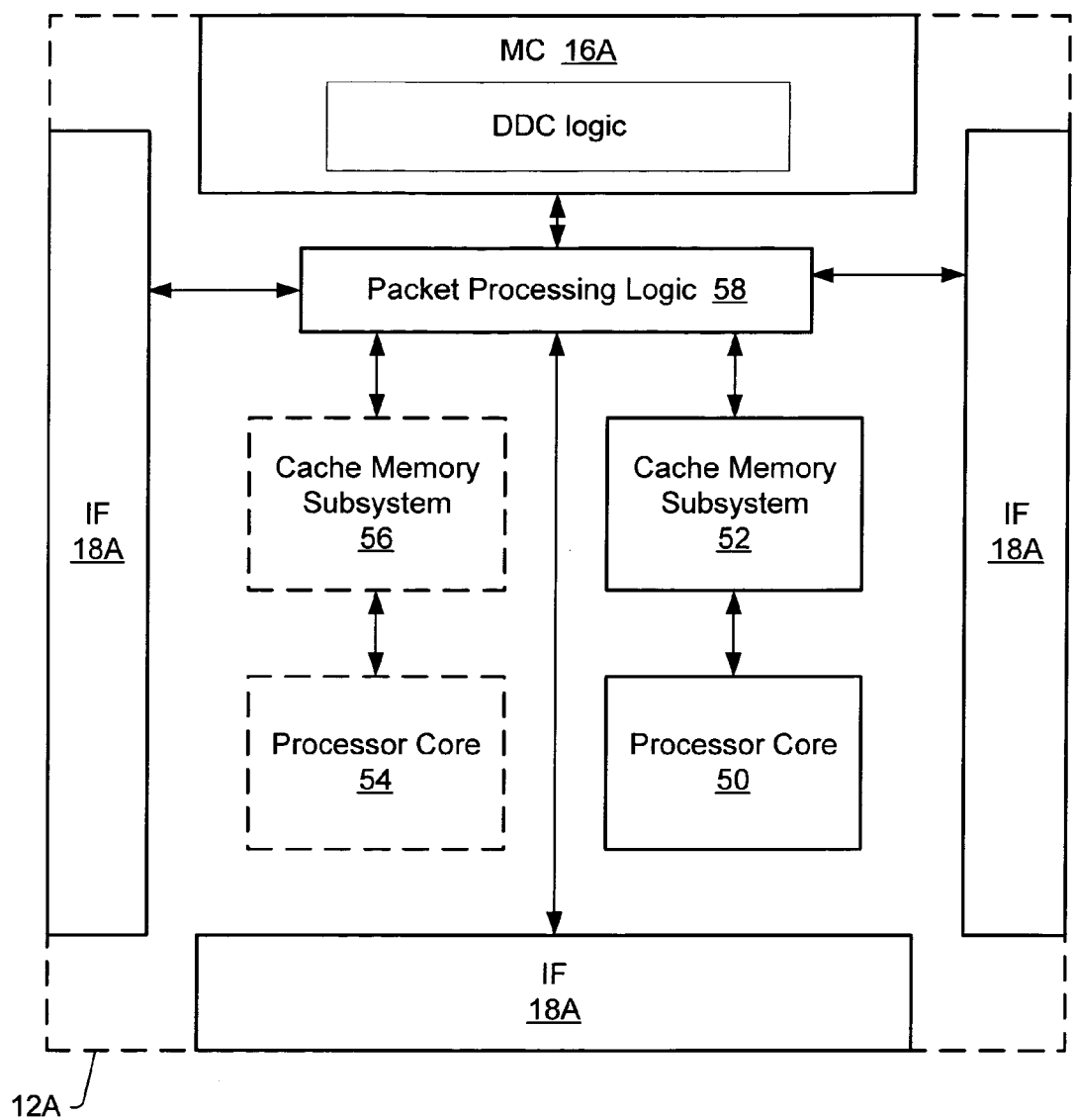
FIG. 3 is a block diagram of one embodiment of a processing node.

Turning next to FIG. 3, a block diagram of one embodiment of an exemplary processing node 12A is shown. Circuit portions that correspond to those of FIG. 1 are numbered identically. Processing node 12A includes memory controller 16A, interface logic 18A, a processor core 50, a cache memory subsystem 52 and packet processing logic 58. Processing node 12A may also include one or more additional processor cores 54 and cache memory subsystems 56, as desired. In one embodiment, the illustrated functionality of processing node 12A is incorporated upon a single integrated circuit. Processing nodes 12B-12D may be configured similarly.

Generally, packet processing logic 58 is configured to respond to control packets received on the links to which processing node 12A is coupled, to generate control packets in response to processor cores 50 and 54 and/or cache memory subsystems 52 and 56, to generate probe commands and response packets in response to transactions selected by memory controller 16A for service, and to route packets for which node 12A is an intermediate node to other nodes through interface logic 18A. Interface logic 18A may include logic to receive packets and synchronize the packets to an internal clock used by packet processing logic 58.

Cache subsystems 52 and 56 comprise high speed cache memories configured to store blocks of data. Cache memory subsystems 52 and 56 may be integrated within respective processor cores 50 and 54. Alternatively, cache memory subsystems 52 and 56 may be coupled to processor cores 52 and 56 in a backside cache configuration or an in-line configuration, as desired. Still further, cache memory subsystems 52 and 56 may be implemented as a hierarchy of caches. Caches which are nearer processor cores 50 and 54 (within the hierarchy) may be integrated into processor cores 50 and 54, if desired. In one embodiment, cache memory subsystems 52 and 56 each represent L2 cache structures.

Processor cores 50 and 54 include circuitry for executing instructions according to a predefined instruction set. For example, the x86 instruction set architecture may be selected. Alternatively, the Alpha, PowerPC, or any other instruction set architecture may be selected. Generally, the processor core 50 and 54 access the cache memory subsystems 52 and 56, respectively, for data and instructions. If a cache miss is detected, a read request is generated and transmitted to the memory controller within the node to which the missing block is mapped.

As will be described in further detail below, in one embodiment of computer system 10, memory controller 16A includes a distributed directory cache with directory entries for use in monitoring data accesses, and probe commands and response traffic for certain transactions. In one embodiment, the memory controller 16A includes dedicated storage for storing the directory entries. However, alternative embodiments may store the directory entries other than the memory controller 16A itself. For example, embodiments are possible in which utilization of cache memory subsystem 52 for the storage of directory entries may be utilized.

Figure 4:
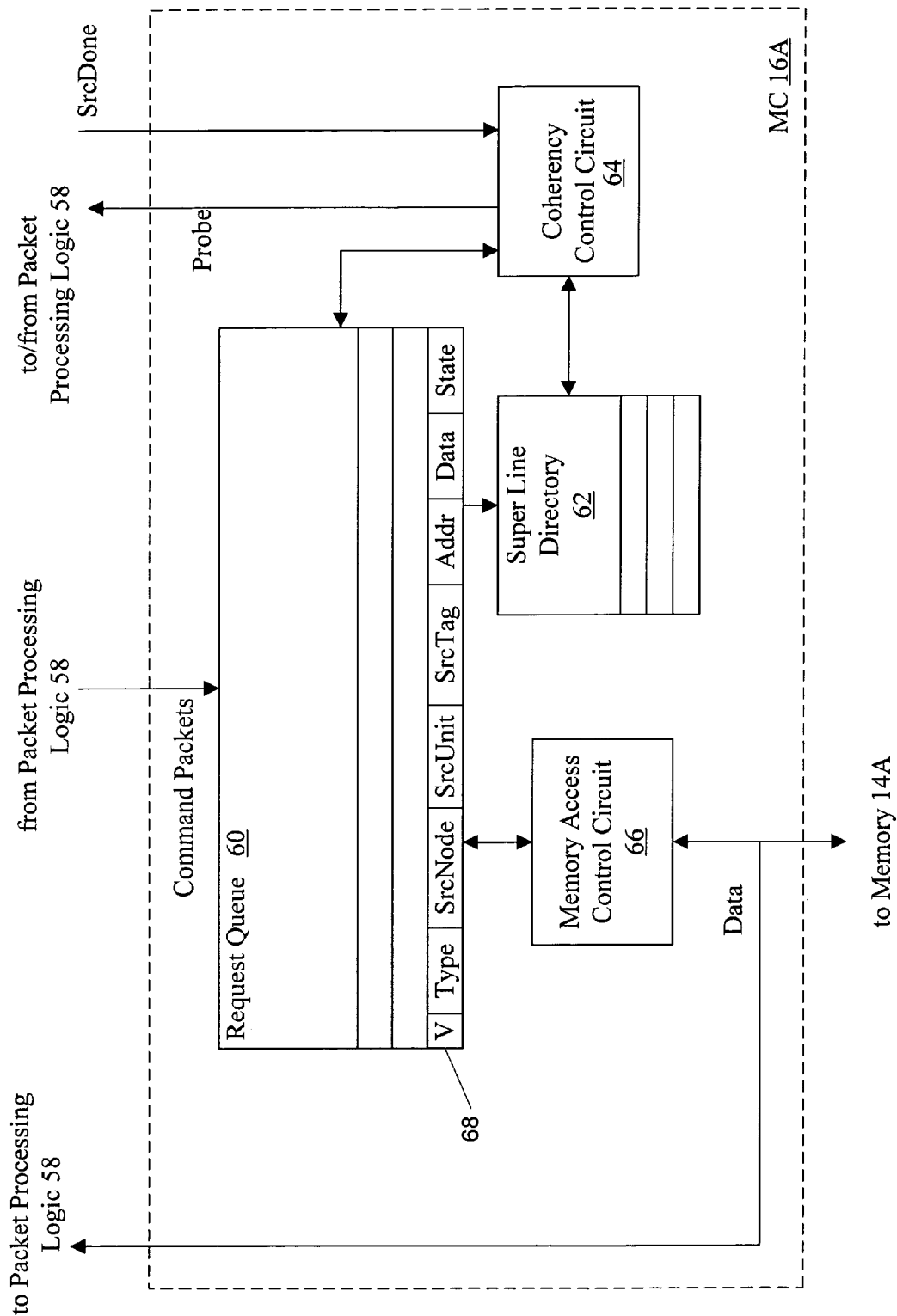
FIG. 4 is a block diagram of one embodiment of a memory controller.

Turning next to FIG. 4, a block diagram of one embodiment of memory controller 16A is shown. Other memory controllers 16B-16D may be configured similarly. Other embodiments are possible and contemplated. In the embodiment of FIG. 4, memory controller 16A includes a request queue 60, a distributed directory cache 62 (also referred to herein as "super line directory 62"), a coherency control circuit 64, and a memory access control circuit 66. Request queue 60 is coupled to receive command packets from packet processing logic 58 and is further coupled to coherency control circuit 64, super line directory 62, and memory access control circuit 66. Coherency control circuit 64 is coupled to super line directory 62 and is further coupled to packet processing logic 58. Memory access control circuit 66 is further coupled to memory 14A and to packet processing logic 58.

Memory controller 16A receives command packets from packet processing logic 58 into request queue 60. The command packets are routed to memory controller 16A by packet processing logic 58 if the address affected by the command corresponds to a memory location in memory 14A. In other words, if the address of the command packet addresses a block stored in memory 14A, the command packet is routed to memory controller 16A. Memory controller 16A queues the command information in request queue 60, and subsequently processes the command. More particularly, coherency control circuit 64 ensures that the command is performed in a coherent fashion. If probes are required for the command, coherency control circuit 64 transmits a probe indication to packet processing logic 58. For example, the probe indication may identify the source node (SrcNode), source unit (SrcUnit), and source tag (SrcTag) from the corresponding command, the address, and the type of command. Packet processing logic 58 may transmit Probe commands in response to the probe indication. Coherency control circuit 64 receives source done (SrcDone) packets from packet processing logic 58, and may further receive probe responses for write sized (WrSized) commands (not shown in FIG. 4).

Memory access control circuit 66 may interface with memory 14A to perform commands which are committed by coherency control circuit 64 (e.g. after coherency operations have been transmitted and any responses to be received from other nodes have been received). If the command is a read, data may be returned from memory 14A to packet processing logic 58 for forwarding to the source node in a read response (RdResponse) packet.

Coherency control circuit 64 may determine if probes are required for a command from the type of command. Additionally, coherency control circuit 64 may inhibit transmission of probes for a first command which may typically require probes (by not transmitting the probe indication to packet processing logic 58 for the first command) if the command indicates no probes are to be conveyed. More particularly, super line directory 62 may comprise a memory configured to store an indication of one or more addresses. Each address may identify a plurality of blocks (i.e, a "superLine") which are known to be either (i) not cached in any caches, or (ii) if cached, then only cached in a shared (S) state. In one embodiment, a block may correspond to a 64B cache line, and a super line may correspond to 256B. Other embodiments are possible and are contemplated.

Generally speaking, by making certain observations concerning the system, the super line directory 62 may be utilized to reduce the number of probes which are conveyed in the system. For example, given current (and projected future) on-die cache sizes, the number of cache-to-cache transfers (also called "dirty misses" or "communication misses") may represent a small fraction of the overall miss rate for the last level of on-die cache. (e.g., the "L2" cache). This may be due in part to the fact that the working set for most commercial workload is on the order of 8-32 MB. In a system which is capacity-miss dominated, most probes return the response that the requested data is not present in any remote cache. Therefore, the data can successfully be obtained from memory and allocated in the requestor's cache in the E (exclusive) state. In the case of instruction references, a similar probe response may be received (i.e., the requested data is not cached anywhere), or the probe responses may indicate the data is cached elsewhere, but only in the S (shared) state. In view of these observations, the following two cases may be optimized:

Case 1—Data accesses in which the probes miss all caches; and

Case 2—Instruction accesses in which a probe hits caches in the S state only.

Case 3—Data accesses in which a probe hits caches in the S state only.

With respect to case 1, if it is known that the data is not cached anywhere, we can simply return data from memory and not send probes. In this manner, read latency for topologies in which probes return later than the DRAM response may be improved. In addition, the read data may also be allocated in the requestor's node in the E-state, which may in turn reduce store upgrade latency. Further, this approach also reduces interconnect bandwidth usage since fewer probes traverse the interconnect.

With respect to case 2, data which is cached only in the S state may have similar benefits to those described above—except that the requestor cannot generally allocate the data in the E state. Rather, the data may be allocated in the S state. However, this approach may work well for instruction references for multi-threaded workloads with large instruction footprints.

Finally, to case 3 is similar to case 2. When a data access hits in one or more remote caches, but only in the S state, the requester may generally only allocate the data in the S state.

In view of the above, in one embodiment a super line directory may be utilized to aid in effecting the above described optimizations. Generally speaking, the super line directory aggregates coherence units (e.g., cache blocks or cache lines) into "super-lines", which are larger than a single coherence unit. On a miss for a particular coherency unit, probes are sent out by the home node memory controller as is normally the case. When the remote nodes are formulating probe responses, they not only formulate a response for the addressed coherency unit, they also determine whether all other coherence units in the same "super-line" as the addressed coherency unit generate the same snoop response. If they do, an indication (e.g., a bit) in the snoop-response may be used to indicate that responses for the entire "super-line" are the same. Probe responses are then conveyed to the requestor. If all probe responses received by the requestor indicate that none of the super line data is cached, an entry is created for the super line in the super line directory of the requestor's node. The rest of the probe process may then generally proceed as normal for this initial miss. On a subsequent miss to the same super line (e.g., a different line or coherency unit of the same super line mentioned above), the requestor's super line directory is interrogated, and if an entry exists for the requested line, the request is converted to a "non-probing read" prior to being conveyed to the home node of the requested data. For example, in one embodiment the read command may include a bit which is used to distinguish non-probing reads from other reads. The home memory controller then receives and services the read, but does not send any probes. Rather, the home node simply returns the data and the requestor then installs the data in the E state.

By way of illustration, FIG. 5 depicts a simple example of blocks/lines and corresponding super lines. FIG. 5 shows a portion of a storage 500. For ease of illustration, storage 500 is shown to be divided into blocks of 64 bytes each. The first block has address "0", the second block has address "64", and so on. Also shown within each block is the binary equivalent of the corresponding decimal address. Therefore, the block with address "64" is shown with the binary equivalent "0000 0100 0000". In the embodiment shown, each block may corresponding to a cache line, and a super line corresponds to a group of four cache lines. Therefore, a first super line 510 includes the blocks addressed as 0, 64, 128, and 192. A second super line 520 includes the blocks addressed as 256, 320, 384, and 448. A third super line 530 includes the blocks addressed as 512, 576, 640, and 704. Finally, a fourth super line 540 includes the blocks addressed as 768, 832, 896, and 960. Of course it is to be understood that the addressing depicted in FIG. 5 is intended to serve as an example only. A wide variety of addressing schemes are both possible and contemplated.

In one embodiment, the identification of a super line corresponding to a given block may be determined by reference to a selected bits of the block address. For example, FIG. 5 illustrates that those blocks with the address "0000XXXXXXXX" 560A, correspond to super line 510 (where "X" indicates a don't care). Similarly, blocks whose address is "0001XXXXXXXX" 560B correspond to super line 520, block addresses "0010XXXXXXXX" 560C correspond to super line 530, and block addresses "0011XXXXXXXX" 560D correspond to super line 540. These super lines, and corresponding entries in the super line directory 62, are discussed further below.

Returning now to FIG. 4, in one embodiment, entries are created in the super line directory 62 in response to read commands for which the corresponding probes (issued due to the miss) result in clean probe responses from the probed nodes. Generally speaking, nodes which receive a probe may determine whether the addressed data is cached within the node, and whether any of the blocks corresponding to the corresponding super line are cached within the node. If none of the blocks corresponding to the super line are cached in the node, then the node may include an indication in the probe response which indicates this fact. In addition, if the corresponding super line data is cached in the node, but only in the S state, an indication to this effect may be included in the probe response.

The probe responses are then collected by the source node and a SrcDone packet is transmitted by the source node in response to receiving the responses and at least one RdResponse packet with the data. If all of the probe responses collected by the source node indicate clean super line responses, then an entry is created in the super line directory of the source node as described above. The super line directory entry may generally include an address corresponding to the super line, and an indication as to whether none of the data is cached, or the data is only cached in the S state. The source node may optionally indicate in the SrcDone packet that clean probe responses were received and none of the corresponding super line data is cached in any of the nodes (or is only cached in the S state). Subsequent to creating an entry in the super line directory 62, the super line directory 62 may be used to inhibit probe issuance for read commands as described below, thereby reducing the probe traffic in the system and alleviating the bandwidth requirements for probes. Furthermore, latency may be reduced for those commands for which probes are not sent, since the source of those commands may complete the commands without waiting for probe responses.

Super line directory 62 may comprise any suitable structure. For example, super line directory 62 may be a fully associative memory in which any entry may be used for any block address. Super line directory 62 may also be a set associative or direct mapped structure in which the block address is used as an index to select an eligible entry or entries corresponding to the block address. A hit may be detected in super line directory 62 in a variety of ways. For example, super line directory 62 may comprise a content addressable memory (CAM) in which the comparing portion stores the address. As each entry corresponds to multiple blocks, a reduced number of bits may be stored to represent the corresponding super line. Alternatively, one or more addresses may be read from super line directory 62 and provided to comparator circuits (e.g. within coherency control circuit 64) for comparison to detect a hit.

An exemplary request queue entry 68 is illustrated in FIG. 4 as well. Other embodiments may store additional, less, or alternative information to the information illustrated in FIG. 4. A request queue entry may be allocated to each command received by memory controller 16A. As illustrated in FIG. 4, a request queue entry includes a valid bit (V), a type field (Type) indicating which type of command is received, a SrcNode field storing the source node number identifying the source node of the command, a SrcUnit field storing the source unit number identifying the source unit within the source node, a SrcTag field storing the source tag assigned by the source node, an address field (Addr) storing the address affected by the command, a data field (Data) for storing the data corresponding to the command (for writes and victim blocks), and a state field (State) storing a state of the request. The state field may be used by coherency control circuit 64 and memory access control circuit 66 to track the progress of a command from reception by request queue 60 through various coherency actions initiated by coherency control circuit 64 and performance of the memory operation by memory access control circuit 66.

As mentioned above, coherency control circuit 64 may provide a probe indication to packet processing logic 58 in cases in which probes are required by the command. In the present embodiment, packet processing logic 58 broadcasts Probe commands to each node in computer system 10. However, other systems may be configured differently. Accordingly, one or more probe commands may be transmitted dependent upon the computer system configuration.

The embodiment of memory controller 16A illustrated in FIG. 4 is one embodiment which may be used in the system illustrated in FIGS. 1-3 above or in other similar system configurations. However, the above computer system embodiment is exemplary only, and memory controller 16A as illustrated in FIG. 4 may be used in other system embodiments as well. For example, while the system embodiment illustrated is a distributed memory system, memory controller 16A and super line directory 62 may be used in a shared memory system in which memory 14A is the complete system memory. Furthermore, memory controller 16A and super line directory 62 may be used in embodiments in which a shared bus is used to couple processors to the memory system (possibly through a memory hierarchy). Furthermore, buses such as those used to couple to one or more AMD Athlon™ processors (in which the address bus is point to point from each processor to a bus bridge) may be used. In such systems, bus transactions or signals may be used to transmit commands, probes, etc, instead of packets (or packets may be used in such systems). Accordingly, while command, probe, and response packets (e.g. SrcDone, TgtDone, and RdResponse) are described as being used in the exemplary embodiment, generally a "message" may be transmitted between components to transmit a command, probe, or response. A "message" may be any form of communication between two components. For example, a message may be a packet (as illustrated in the exemplary embodiment herein), a bus transaction, a dedicated signal or signals between the components, etc. Generally, the super line directory may be implemented at the point of coherency in any given computer system (or points of coherency, in a distributed memory system).

As used herein, the term "hit", when referring to the super line directory, refers to an input block address matching with one of the block addresses for which an indication is stored in the super line directory. The indication may be the block address itself, in some embodiments. In another embodiment in which page addresses and valid bits are stored, the indication may be the page address corresponding to the block address and the corresponding valid bit being set. Any indication which identifies a given block address may be used. The term "miss", when referring to the super line directory, refers to an input block address not matching with any of the block addresses for which an indication is stored in the super line directory. Additionally, a "clean probe response" is a response indicating that the transmitter of the response is not caching the block corresponding to the probe in a modified state or a state that allows the transmitter to modify the block without communicating with the point of coherency. As noted above, the probe response may further indicate that none of the blocks of the corresponding super line are cached in the node, or are only cached in the S state. For example, in the MESI or MOESI protocols, the cache states that comprise a clean probe response may be invalid and shared. In other words, the cache states that are modified or allow the transmitter to modify the block without communicating with the point of coherency may include the modified and exclusive states of the MESI protocol or the modified, exclusive, and owned state in the MOESI protocol. A device having "exclusive access" to a block means that the device is the only device other than the memory which has access to the block. A device having exclusive access may be allowed to modify the block without communicating with the point of coherency.

Figure 6A:
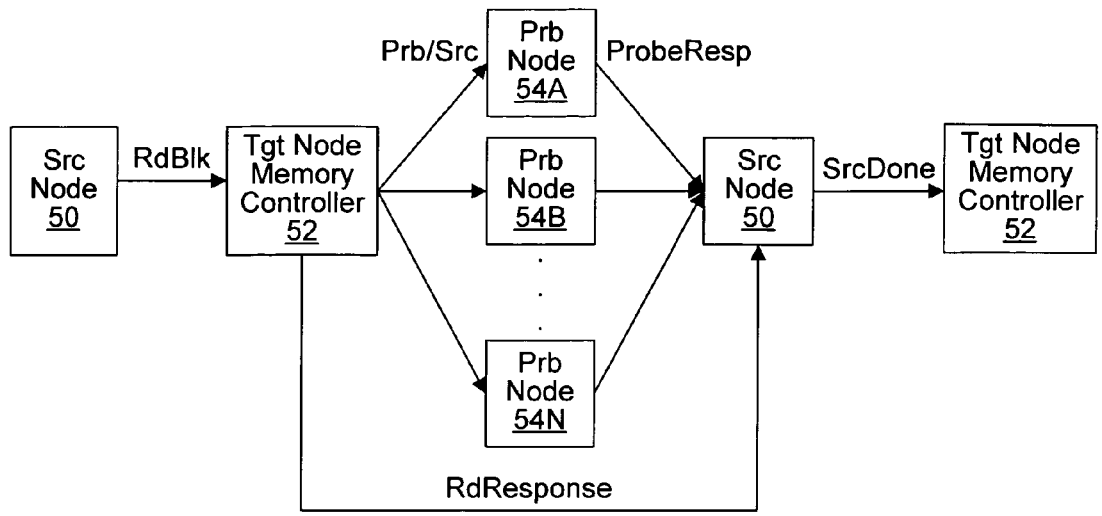
FIG. 6A depicts one embodiment of a coherency transaction.
Figure 6B:
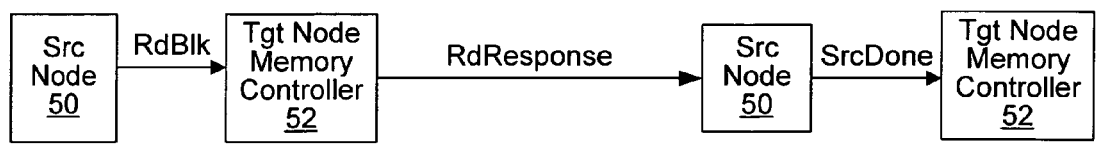
FIG. 6B depicts one embodiment of a coherency transaction.

Turning now to FIGS. 6A and 6B, embodiments of a sequence of events are depicted in which a super line directory may be used. In the example of FIG. 6A, a diagram is shown illustrating the flow of packets between a set of nodes corresponding to an exemplary read block transaction. A source node 50, a target node memory controller 52, and a set of probed nodes 54A-54N are shown. The order (in time) of packets is illustrated from left to right in FIGS. 6A and 6B. In other words, a RdBlk packet is transmitted from source node 50 to target node memory controller 52 before target node memory controller 52 transmits probe/src packets to probe nodes 54A-54N, etc. In order to illustrate the time order of packets, source node 50 and target memory controller 52 are illustrated twice in FIGS. 6A and 6B. Source node 50, the target node including target node memory controller 52, and probed nodes 54A-54N each may comprise processing nodes similar to processing nodes 12A-12D shown in FIG. 1.

Source node 50 transmits a RdBlk packet to target node memory controller 52 to initiate the read block transaction. Target node memory controller 52 subsequently selects the RdBlk packet to be serviced. Target node memory controller 52 generates Probe/Src packets and broadcasts the packets to the probed nodes 54A-54N. Additionally, target node memory controller 52 initiates a read from the memory 14A-14D to which target node memory controller 52 is coupled. Upon completing the read from the memory 14A-14D, target node memory controller 52 generates a RdResponse packet including the data and transmits the packet to source node 50.

Each of probed nodes 54A-54N searches its caches to determine if the cache block identified by the RdBlk packet is stored therein. If a hit is detected, the corresponding probed node 54A-54N may update the state of the cache block. Additionally, each probed node 54A-54N routes a ProbeResp packet to source node 50 (since Probe/Src packets were received). In addition, each node determines whether any of the cache blocks of the super line which correspond to the identified cache block are stored therein. In the present example, no probed node 54A-54N is storing a dirty copy of the cache block. Further, no probed node 54A-54N is storing a dirty copy of any of the corresponding super line cache blocks. Therefore, each probed node indicates in its respective ProbeResp packet that there was no hit on the super line.

Source node 50 awaits ProbeResp packets from probed nodes 54A-54N and the RdResponse packet from target memory controller 52. Once these packets have been received, source node 50 transmits a SrcDone packet to target memory controller 52, terminating the transaction. Source node 50 further detects that all responses indicate no hits to the corresponding super line. Therefore, the source node 50 creates an entry in its super line directory which corresponds to the read transaction. In this scenario, all probe responses indicated clean super line responses. Therefore, the created super line directory entry indicates the super line data is not cached elsewhere. The source node 50 may further convey a SrcDone packet to the home node. In addition, the source node 50 may include in the SrcDone packet an indication that no hits to the super line were detected.

After creating the super line directory entry, FIG. 6B depicts a further read access by the source node 50. In FIG. 6B, source node 50 initiates a read transaction to a memory block which misses in the source node 50. In this case, the read transaction is directed to the same super line as that described in FIG. 6A for which an entry was created. Prior to transmitting a RdBlk packet to the home node memory controller 52, the source node 50 accesses its super line directory and detects an entry corresponding to the read address. As the entry indicates no cached copies of the super line blocks exist in any of the other nodes, the read request is converted to a non-probing read before being conveyed to the home node. The home node memory controller 52 detects that the read is a non-probing read and inhibits the generation of probes to the other nodes. The home node memory controller 52 then generates a RdResponse packet including the data and transmits the packet to source node 50. Accordingly, upon receipt of the RdResponse packet, the source node 50 may complete the transaction without waiting for probe responses as described above. The source node 50 may retain or set an indication that the forthcoming response will not include probe responses. Alternatively, the RdResponse packet may indicate no probes are forthcoming.

In addition to the above, the source node 50 allocates the received data in a state dependent upon an indication stored within the super line directory entry. For example, in the above described scenario, the super line directory entry indicated that the corresponding data was not cached elsewhere. Therefore, the source node 50 may allocate the received data in the E state. Alternatively, if the super line directory entry had indicated that the data was cached elsewhere only in the S state, the source node 50 may allocate the data in the S state.

Figure 7:
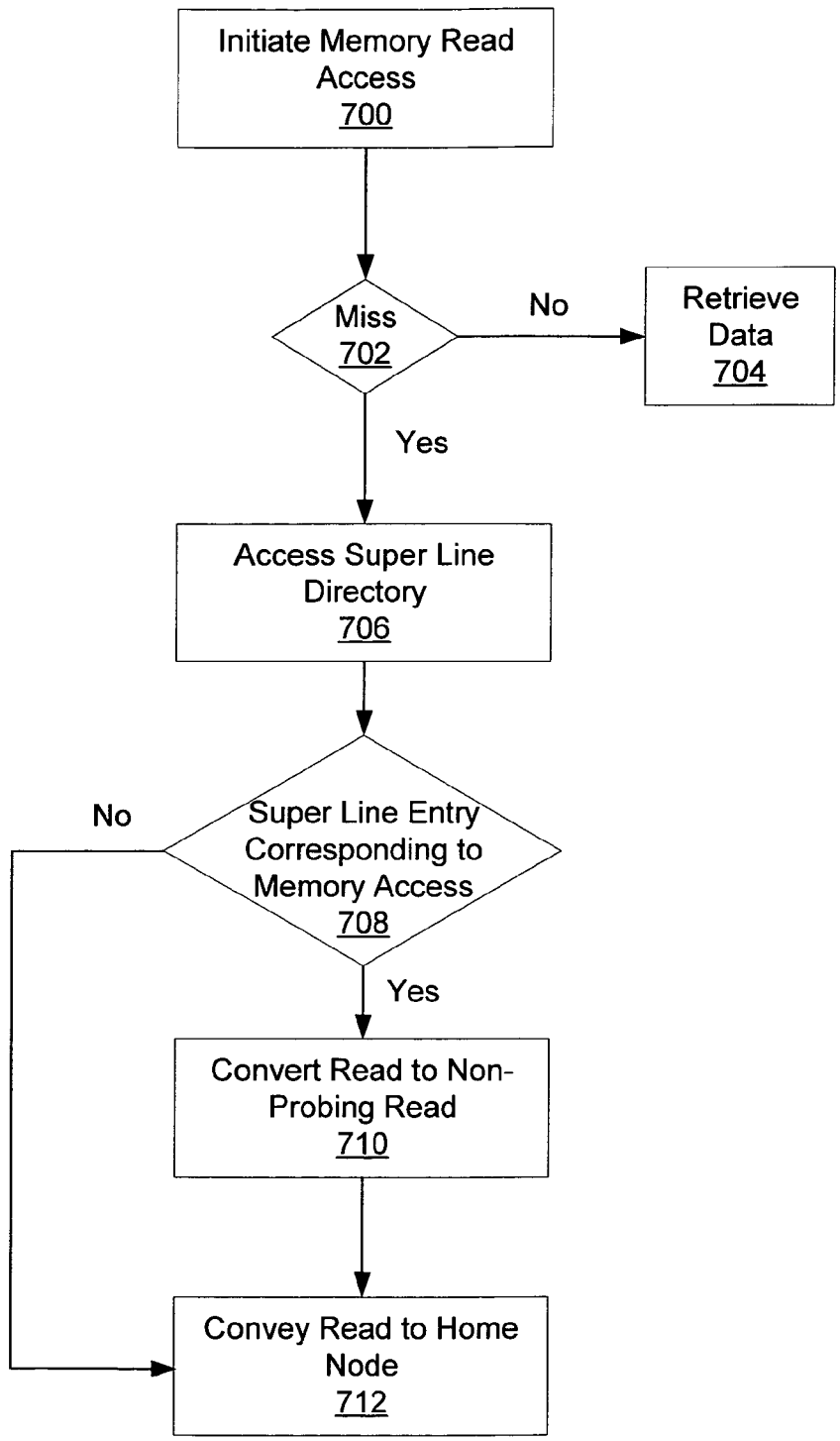
FIG. 7 illustrates one embodiment of a method in a source node.

FIG. 7 illustrates one embodiment of a method in a source node. Subsequent to initiating a read transaction (block 700), a determination is made as to whether or not a valid copy exists in the source node (decision block 702). If a valid copy is present in the source node, the data may simply be retrieved (block 704). Alternatively, if a valid copy is not present in the source node (i.e., a miss is detected), the source node super line directory is accessed (block 706). If there exists an entry in the super line directory which corresponds to the read transaction (decision block 708), the read transaction is converted to a non-probing read (block 710) (e.g., by setting a bit or providing some other indication) and the converted read is conveyed to the home node for the memory location being accessed (block 712). If there does not exist an entry in the super line directory (decision block 708), the read access is conveyed to the home node without being converted to a non-probing read.

Figure 8:
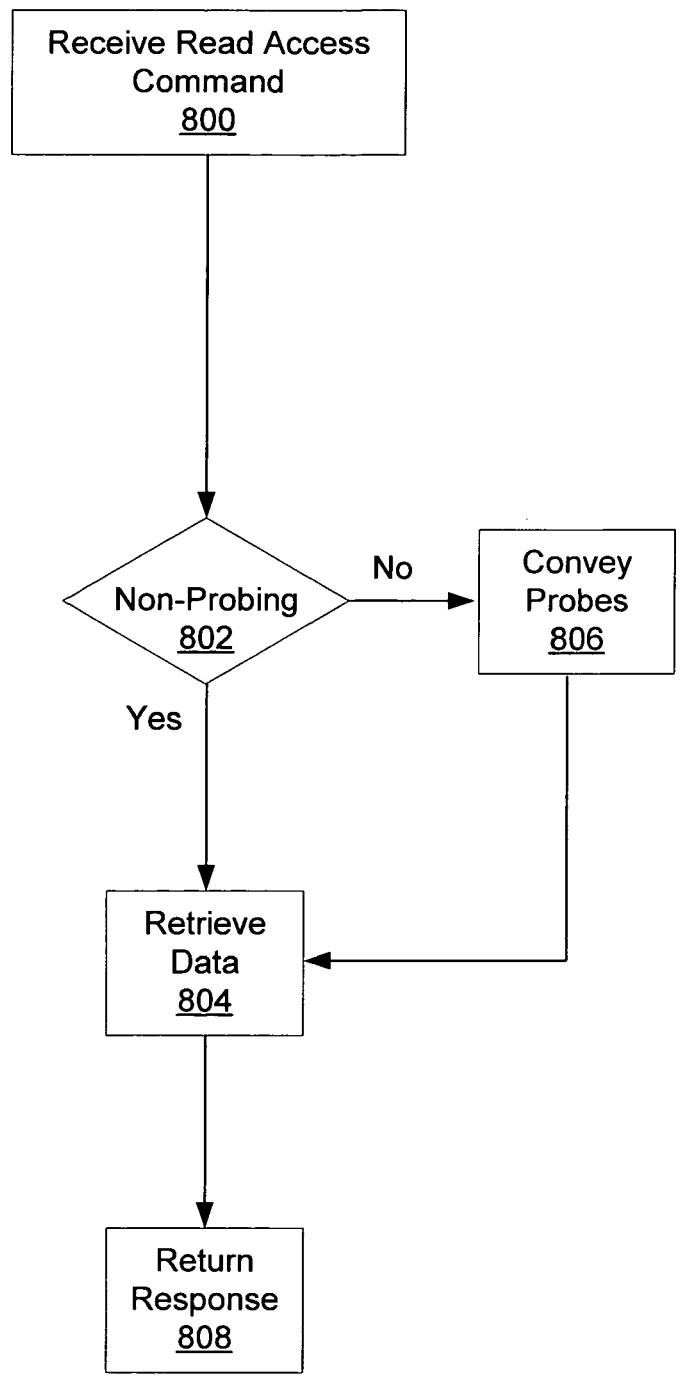
FIG. 8 illustrates one embodiment of a method in a home node.

FIG. 8 depicts one embodiment of a method for processing transactions in a home node. Upon receiving a read access at a home node (block 800), a determination is made as to whether the received read command is a non-probing read (decision block 802). If the read is a not a non-probing read, the home node may simply retrieve the requested data (block 804) and return the data to the requesting source node (block 808). If the read is a probing read, the home node may also convey probes (block 806) to other nodes as described above.

Figure 9:
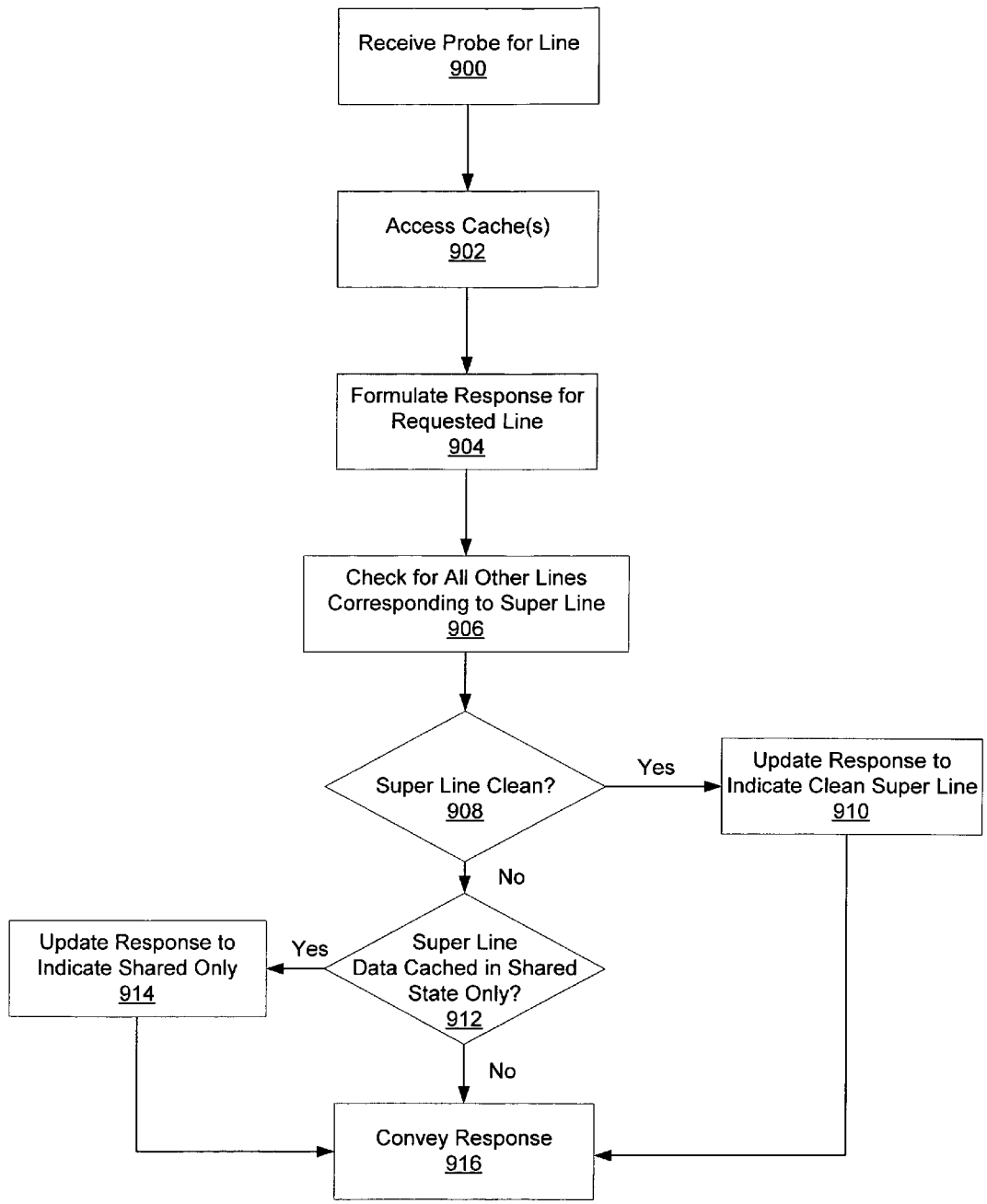
FIG. 9 illustrates one embodiment of a method in a target node.

Finally, FIG. 9 depicts one embodiment of transaction processing occurring in a node which receives a probe. Subsequent to receiving a probe directed to a particular coherency unit (block 900) (e.g., a cache line), the receiving node accesses its cache(s) and/or other storage (block 902) to determine whether a copy of the requested unit is present in the node. In addition to formulating a response for the unit identified by the probe (block 904), the node may also determine whether other units in the same super line as the requested unit are present in the node (block 906). If none of the super line data is cached by the node, the probe response indicates the super line is clean (block 910) and the response is conveyed to the source node (block 916). Alternatively, if data corresponding to the super line is cached within the node (decision block 908), it may be determined what state the data is cached in the node. If the data is cached only in the S state (decision block 912), the node may provide a probe response which indicates the data is only cached in the S state. If the super line data is cached in other than the S state, the probe response may be conveyed (block 916) without indicating the data is cached in only the S state.

In addition to the above, it is noted that in certain embodiments, race conditions between non-probing requests and write requests of various forms may occur. In one embodiment, a retry mechanism is utilized to handle race conditions. As an example, assume a non-probing read request corresponding to a super line is conveyed by a node, and while the non-probing request is outstanding, a write to the same super line is also conveyed by another node. In one embodiment, all outstanding non-probing reads are "snooped" for conflicts with requests from other nodes during the time they are outstanding to memory. In such an embodiment, the node issuing the non-probing request may simply discard the results when the non-probing request returns from memory, and reissue the request as a probing request. In this manner, forward progress may be made since probing requests always make progress.

It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Thus, various embodiments may further include receiving, sending or storing instructions and/or data implemented in accordance with the foregoing description upon a computer accessible medium.

Numerous variations and modifications will become apparent to those skilled in the art once the above disclosure is fully appreciated. It is intended that the following claims be interpreted to embrace all such variations and modifications.

What is claimed is:

1. A system comprising a plurality of nodes, the system comprising:

a source node configured to convey a request for a cache line; and a home node coupled to receive the request;

wherein prior to conveying the request, the source node is configured to:

access a super line directory comprising a plurality of entries, wherein each entry stores a single address that identifies a super line which comprises a plurality of cache lines, each of the cache lines having a coherency state that does not allow modification by any node without first communicating with the source node;

determine by said access whether the requested cache line corresponds to a super line with an entry in the super line directory; and indicate that the request is a non-probing request in response to determining that the requested cache line corresponds to a super line with an entry in the super line directory, a non-probing request comprising a given request which inhibits a home node receiving the given request from conveying probes in response to the given request.

2. The system as recited in claim 1, wherein the coherency state of a cache line within a super line includes at least one of the following: invalid state and shared state.

3. The system as recited in claim 1, wherein the source node is further configured to create an entry in the super line directory responsive to detecting probe responses from target nodes corresponding to a probing request for a requested cache line indicate a plurality of cache lines including the requested cache line have a coherency state that does not allow modification by any node without communicating with the source node.

4. The system as recited in claim 3, wherein in response to receiving the request, the home node is configured to:
   initiate the conveyance of one or more probes corresponding to the cache lines of the super line to one or more target nodes of the plurality of nodes, in response to determining the request is not a non-probing request; and
   inhibit conveyance of the one or more probes, in response to determining the request is a non-probing request.

5. The system as recited in claim 4, wherein in response to receiving a probe of the one or more probes from the home node, each target node is configured to:
   determine whether any of the plurality of cache lines of the super line are cached within the target node; and
   convey a response which indicates whether any of the cache lines of the super line are cached within the node.

6. The system as recited in claim 4, wherein the source node is configured to:
   receive a response corresponding to the requested cache line from each of the target nodes; and
   store an indication that indicates none of the target nodes are currently caching any of the cache lines of the super line, in response to determining all responses received from all of the target nodes indicate none of the cache lines are cached by the target node which conveyed, the response.

7. The system as recited in claim 3, wherein the home node further comprises a memory to which the cache line is allocated, and wherein the home node is configured to retrieve the cache line from the memory and convey a response to the source node with the retrieved cache line.

8. The system as recited in claim 1, wherein in response to detecting a write request from another node is directed to the super line while the non-probing request conveyed by the source node is outstanding, the source node is configured to discard results received in response to the non-probing request and reissue the non-probing request as a probing request.

9. A method for use in a computing system comprising a plurality of nodes, the method comprising:
   formulating a request in a source node for a cache line;
   accessing a super line directory comprising a plurality of entries, wherein each entry stores a single address that identifies a super line which comprises a plurality of cache lines, each of the cache lines having a coherency state that does not allow modification by any node without first communicating with the source node;
   determining by said access whether the requested cache line corresponds to a super line with an entry in the super line directory;
   indicating that the request is a non-probing request, in response to determining that the requested cache line corresponds to a super line with an entry in the super line directory, a non-probing request comprising a given request which inhibits a home node receiving the given request from conveying probes in response to the given request; and
   conveying the request to a home node of the requested cache line.

10. The method as recited in claim 9, wherein the coherency state of a cache line within a super line includes at least one of the following: invalid state and shared state.

11. The method as recited in claim 10, wherein in response to receiving the request, the method further comprises the home node:
   initiating the conveyance of one or more probes corresponding to the cache lines of the super line to one or more target nodes of the plurality of nodes, in response to determining the request is not a non-probing request; and
   inhibiting conveyance of the one or more probes, in response to determining the request is a non-probing request.

12. The method as recited in claim 11, wherein in response to receiving a probe of the one or more probes from the home node, the method further comprises each target node:
   determining whether any of the plurality of cache lines of the super line are cached within the target node; and
   conveying a response which indicates whether any of the cache lines the super line am cached within the node.

13. The method as recited in claim 11, further comprising the source node:
   receiving a response corresponding to the requested cache line from each of the target nodes; and
   storing an indication that indicates none of the target nodes are currently caching any of the cache lines of the super line, in response to determining all responses received from all of the target nodes indicate none of the cache lines are cached by the target node which conveyed the response.

14. The method as recited in claim 10, wherein the home node comprises a memory to which the cache line is allocated, and wherein the method further comprises the home node retrieving the cache line from the memory and convey a response to the source node with the retrieved cache line.

15. The method as recited in claim 9, further comprising creating an entry in the super line directory responsive to detecting probe responses from target nodes corresponding to a probing request for a requested cache line indicate a plurality of cache lines including the requested cache line have a coherency state that does not allow modification by any node without communicating with the source node.

16. The method as recited in claim 9, wherein in response to detecting a write request from another node is directed to the super line while the non-probing request conveyed by the source node is outstanding, the method further comprises the source node discarding results received in response to the non-probing request and reissuing the non-probing request as a probing request.

17. A computer readable storage medium comprising program instructions for use in a computing system comprising a plurality of nodes, wherein the program instructions are executable to:
   formulate a request in a source node for a cache line;
   access a super line directory comprising a plurality of entries, wherein each entry stores a single address that identifies a super line which comprises a plurality of cache lines, each of the cache lines having a coherency state that does not allow modification by any node without first communicating with the source node;

determine by said access whether the requested cache line corresponds to a super line with an entry in the super line directory;

indicate that the request is a non-probing request, in response to determining that the requested cache line corresponds to a super line with an entry in the super line directory, a non-probing request comprising a given request which inhibits a home node receiving the given request from conveying probes in response to the given request; and convey the request to a home node of the requested cache line.

18. The computer readable storage medium as recited in claim 17, wherein the coherency state of a cache line within a super line includes at least one of the following: invalid state and shared state.

19. The computer readable storage medium as recited in claim 18, wherein in response to receiving the request, the program instructions are further executable in the home node to:

initiate the conveyance of one or more probes corresponding to the cache lines of the super line to one or more target nodes of the plurality of nodes, in response to determining the request is not a non-probing request; and inhibit conveyance of the one or more probes, in response to determining the request is a non-probing request.

20. The computer readable storage medium as recited in claim 19, wherein in response to receiving a probe of the one or more probes from the home node, the program instructions are further executable in each target node to;

determine whether any of the plurality of cache lines of the super line are cached within the target node; and convey a response which indicates whether any of the cache lines of the super line are cached within the node.

21. The computer readable storage medium as recited in claim 19, wherein the program instructions are further executable in the source node to:

receive a response corresponding to the requested cache line from each of the target nodes; and store an indication that indicates none of the target nodes are currently caching any of the cache lines of the super line, in response to determining all responses received from all of the target nodes indicate none of the cache lines are cached by the target node which conveyed the response.

22. The computer readable storage medium as recited in claim 17, wherein the program instructions are further executable to create an entry in the super line directory responsive to detecting probe responses from target nodes corresponding to a probing request for a requested cache line indicate a plurality of cache lines including the requested cache line have a coherency state that does not allow modification by any node without communicating with the source node.

23. The computer readable storage medium as recited as recited in claim 17, wherein in response to detecting a write request from another node is directed to the super line while the non-probing request conveyed by the source node is outstanding, the program instructions are further executable in the source node to discard results received in response to the non-probing request and reissue the non-probing request as a probing request.

* * * * *